United States Patent
Besselievre et al.

(10) Patent No.: US 9,605,427 B2
(45) Date of Patent: Mar. 28, 2017

(54) PROCESS FOR MANUFACTURING XEROGELS

(71) Applicant: ENERSENS, Longjumeau (FR)

(72) Inventors: Elodie Besselievre, Bourgoin-Jallieu (FR); Emilie Darrigues, Benesse-Maremne (FR); Sophie Chausson, Monthlery (FR); Gilbert Pouleyn, Mayenne (FR)

(73) Assignee: ENERSENS, Longjumeau (FR)

( * ) Notice: Subject to any disclaimer, the term of this patent is extended or adjusted under 35 U.S.C. 154(b) by 145 days.

(21) Appl. No.: 14/351,446

(22) PCT Filed: Oct. 15, 2012

(86) PCT No.: PCT/EP2012/070430
§ 371 (c)(1),
(2) Date: Apr. 11, 2014

(87) PCT Pub. No.: WO2013/053951
PCT Pub. Date: Apr. 18, 2013

(65) Prior Publication Data
US 2014/0252263 A1    Sep. 11, 2014

(30) Foreign Application Priority Data
Oct. 14, 2011    (FR) ...................................... 11 59331

(51) Int. Cl.
*C04B 28/00*    (2006.01)
*C04B 28/24*    (2006.01)
(Continued)

(52) U.S. Cl.
CPC .............. *E04B 1/80* (2013.01); *C04B 28/005* (2013.01); *C04B 28/24* (2013.01); *C04B 38/00* (2013.01);
(Continued)

(58) Field of Classification Search
CPC ..... C01B 33/16; C01B 33/163; C01G 23/047; C01G 23/053; C01G 23/0536;
(Continued)

(56) References Cited

U.S. PATENT DOCUMENTS 2,945,817 A    7/1960  Goldblum
4,829,031 A *  5/1989  Roy .......................... C01F 7/02
                                                      423/600
(Continued)

FOREIGN PATENT DOCUMENTS

EP    0 658 513 A1    6/1995
FR    2 873 677 A1    2/2006
(Continued)

OTHER PUBLICATIONS

International Search Report, mailed Nov. 6, 2012, issued in PCT/EP2012/070430.

*Primary Examiner* — Anthony J Zimmer
(74) *Attorney, Agent, or Firm* — Birch, Stewart, Kolasch & Birch, LLP

(57) ABSTRACT

The present invention is related to a process for manufacturing xerogels optionally containing a fibrous reinforcement material, to an insulating, self-supporting single-layer composite panel of thickness between 30 mm and 70 mm of xerogel comprising a fibrous reinforcement material comprising a nonwoven fibrous batting obtainable by this process and to the use thereof for the manufacture of building materials and thermal insulations.

12 Claims, 1 Drawing Sheet

(51) Int. Cl.
*C04B 38/00* (2006.01)
*E04B 1/80* (2006.01)
*C04B 111/40* (2006.01)

(52) U.S. Cl.
CPC ....... *C04B 38/0045* (2013.01); *C04B 2111/40* (2013.01)

(58) Field of Classification Search
CPC ......... C01G 25/02; C01G 45/02; C01F 11/18; C01F 11/185; C01F 11/02; E04B 1/80; C04B 38/00; C04B 38/0045; C04B 28/24; C04B 28/005; C04B 2111/40
See application file for complete search history.

(56) References Cited

U.S. PATENT DOCUMENTS

| | | | |
|---|---|---|---|
| 5,306,555 A | 4/1994 | Ramamurthi et al. | |
| 5,565,142 A * | 10/1996 | Deshpande | B01J 13/0091 252/62 |
| 5,705,535 A | 1/1998 | Jansen et al. | |
| 5,786,059 A | 7/1998 | Frank et al. | |
| 5,789,075 A | 8/1998 | Frank et al. | |
| 5,795,556 A | 8/1998 | Jansen et al. | |
| 5,866,027 A | 2/1999 | Frank et al. | |
| 6,378,229 B1 | 4/2002 | Hartel et al. | |
| 6,479,416 B1 | 11/2002 | Frank et al. | |
| 2001/0034375 A1* | 10/2001 | Schwertfeger | B01J 13/0091 516/98 |
| 2006/0125158 A1 | 6/2006 | Rouanet et al. | |
| 2006/0199455 A1 | 9/2006 | Stepanian et al. | |
| 2007/0154698 A1 | 7/2007 | Stepanian | |
| 2007/0173157 A1 | 7/2007 | Trifu et al. | |
| 2008/0093016 A1 | 4/2008 | Lee et al. | |
| 2009/0229032 A1 | 9/2009 | Stepanian et al. | |
| 2012/0228545 A1* | 9/2012 | Ebert | C01B 33/163 252/182.32 |

FOREIGN PATENT DOCUMENTS

| | | | | |
|---|---|---|---|---|
| FR | 2873677 A1 * | 2/2006 | ............ | C01B 33/16 |
| JP | H10-504792 A | 5/1998 | | |
| WO | WO 99/32218 A1 | 7/1999 | | |
| WO | WO 2007/021493 A2 | 2/2007 | | |
| WO | WO 2011/066209 A2 | 6/2011 | | |

* cited by examiner

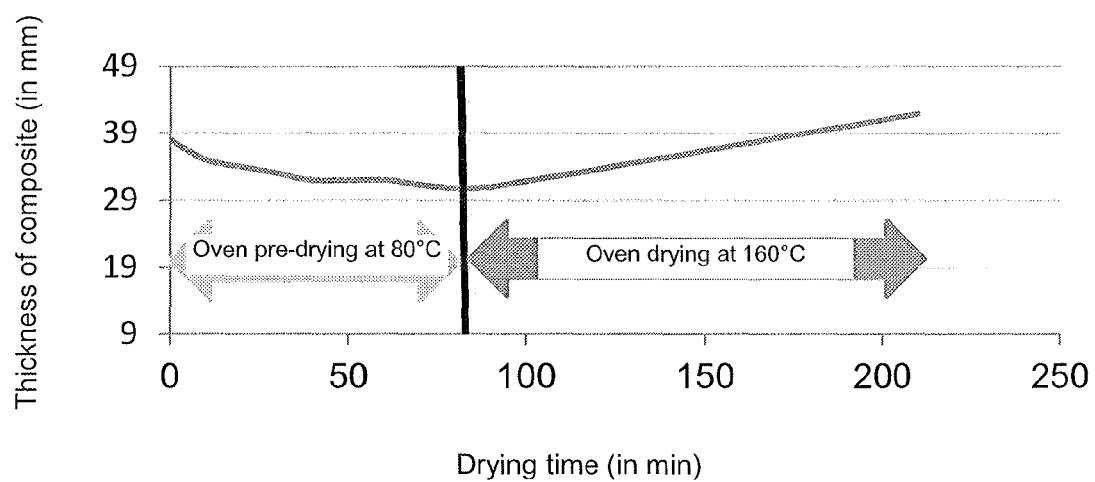

PROCESS FOR MANUFACTURING XEROGELS

The present invention concerns a process for manufacturing xerogels, the xerogels obtainable by the process and the uses thereof.

Energy savings, and more particularly heat insulation, are currently central issues for the building industry.

Heat insulation is obtained by inserting insulating panels inside walls and partitions. These insulating panels are conventionally made of glass wool, rock wool, expanded polystyrene or extruded polystyrene, generally glued onto a plaster board.

The heat insulating performance of the materials is measured according to their thermal conductivity. The lower the thermal conductivity value, the lesser the material conducts heat and the better its heat insulation. In the present invention, thermal conductivity is measured using the guarded hot plate method of standard NF EN 12667 at 20° C. and at atmospheric pressure dated July 2001.

However, industrialists are searching for ever better performing and more economical insulating materials.

It is within this context that reinforced insulating materials containing aerogels and xerogels have been developed.

A gel has a three-dimensional continuous structure composed of particles forming nanopores. The preparation of a gel involves a sol-gel transition step i.e. the changeover from a suspension of solid particles, the sol, to a gelatinous material of solid appearance, the gel.

Depending on the type of liquid present in the pores of the gel, a distinction is made between aerogels and xerogels (air), hydrogels (water), organogels (organic solvent) in particular alcogels (alcohol). All the terms of hydrogels, alcogels and organogels are grouped together under the more general definition of lyogels.

The term aerogel generally refers to a gel dried under supercritical conditions, i.e. the majority solvent is in the state of a supercritical fluid under these conditions. This type of drying requires restrictive conditions of temperature and pressure that are generally costly in terms of energy.

In opposition, the term xerogel refers to a gel dried under subcritical conditions i.e. the majority solvent is not in the supercritical fluid state under these conditions.

Xerogels and aerogels are of great interest not only for their heat and sound insulating qualities but also for their low density.

However the manufacturing cost of insulating materials must not be prohibitive for industrialists and consumers. The process for manufacturing such materials must not therefore entail costly temperature and pressure conditions. It is therefore preferable to avoid drying steps under supercritical conditions which require the use of reactors withstanding high pressures that are more costly than commonly used reactors. The choice is therefore preferably focused on materials containing xerogels.

Patent FR 2 873 677 for example discloses a method for preparing xerogels of particulate hydrophobic silica consisting of subjecting a silica organogel to hydrophobizing treatment, separating the organogel thus obtained and removing the solvent by evaporation. The removal of the solvent is performed using a single drying step.

However, the prior art does not indicate how to obtain a homogeneous xerogel. It is effectively preferable to obtain homogeneous xerogels to guarantee constant product quality.

There is therefore a need for industrialists to have available a process for manufacturing homogeneous xerogels which is reproducible, reliable and has high productivity.

Additionally, it is preferable for industrialists that said process should allow the manufacture of xerogels of different types, such as for example particulate xerogels, composite xerogels, reinforced self-supporting xerogels.

By "self-supporting" in the present invention is meant that the stability of the product is not due to an external support but solely to the fact that the panel is of rigid shape. By "rigid" is meant that the panel cannot be significantly deformed without observing the formation of cracks and even rupture of the panel. In particular this means that the panel cannot be rolled up.

Therefore the transport and handling of panels of xerogels are thereby simplified.

It is also of importance for applications in the building sector to obtain a thickness of insulating material of more than 30 mm. New standards for the interior insulation of buildings (*Réglementation Thermique* 2012 *Française*) recommend the use of panels whose heat resistance is R=3 $m^2 \cdot K/W$.

International patent application WO 2011/066209 describes rigid insulating composite materials including an aerogel or a xerogel in the form of microparticles and a binder, optionally a fibrous reinforcement material. The binder is preferably chosen from among cement, gypsum, lime. The examples illustrating the composite materials of this document have a thickness of less than 2 cm. Document WO 2011/066209 also describes a method for manufacturing insulating composite materials. This method comprises mixing an aerogel or particulate xerogel and a binder, optionally with a fibrous reinforcement material, transferring the mixture to a mould then hardening the composite. At least part of the hardening step is performed under compression. The material thus obtained is then dried in air for 24 h, but document WO 2011/066209 does not further describe the drying conditions of the material.

Document U.S. Pat. No. 5,866,027 describes a method for manufacturing rigid xerogels reinforced with fibres by drying organogels under subcritical conditions. In this method, the solvent used when forming the gel is exchanged by an apolar solvent such as n-heptane or n-hexane prior to the drying step. However, the thickness of the fibre-reinforced xerogels thus obtained is between 3 and 7 mm. In addition the description explicitly indicates that it is necessary to join panels together to obtain a thick panel (col. 5 lines 49-55).

Consequently the self-supporting, insulating xerogels of the prior art, whether particulate or non-particulate, reinforced or not reinforced with fibrous materials, have a thickness which therefore requires the adjoining of several layers of self-supporting, insulating, xerogel-containing materials obtained according to the prior art in order to reach the desired performance levels.

The subject of the present invention therefore concerns a process for manufacturing xerogels having a thermal conductivity of between 5 and 25 mW/m·K measured using the guarded hot plate method of standard NF EN 12667 at 20° C. and at atmospheric pressure, of which at least one of the steps is conducted in a reactor, a characteristic distance of said reactor between two inner walls being at least between 6 mm and 70 mm.

Another subject of the invention concerns a xerogel having a thermal conductivity of between 5 and 25 mW/m·K measured using the guarded hot plate method of standard NF EN 12667 at 20° C. and at atmospheric pressure, optionally comprising a fibrous reinforcement material obtainable by the process of the invention.

A further subject of the invention concerns a self-supporting, insulating, single-layer composite panel having a thermal conductivity of between 5 and 25 mW/m·K, measured using the guarded hot plate method of standard NF EN 12667 at 20° C. and at atmospheric pressure, and a thickness of between 30 mm and 70 mm of xerogel comprising a fibrous reinforcement material obtainable by the process of the invention.

A further subject of the invention concerns the use of xerogels according to the invention for the manufacture of building materials.

A further subject of the invention concerns the use of self-supporting, insulating, single-layer composite panels according to the invention for the manufacture of building materials.

The present invention concerns a process for manufacturing xerogels having a thermal conductivity of between 5 and 25 mW/m·K measured using the guarded hot plate method of standard NF EN 12667 at 20° C. and at atmospheric pressure, comprising the successive steps of:
a) pouring a sol having alcohol as solvent into a reactor in which a fibrous reinforcement material has optionally previously been placed,
b) gelling the sol to an alcogel,
c) ageing the alcogel,
d) hydrophobization treatment of the alcogel, after which a hydrophobized alcogel is obtained, and
e) optionally, pre-drying of the alcogel under subcritical conditions at a temperature equal to or lower than 80° C., said pre-drying being compulsory if a fibrous reinforcement material is added at step a), and
f) drying the alcogel under subcritical conditions, said drying being of dielectric or convective type, notably at a temperature higher than 100° C. when said drying is of convective type, so that the xerogel obtained has a residual quantity of alcohol by panel weight of 3% or lower, notably 2% or lower, advantageously 1% or lower as per standard EN/ISO 3251,
provided that at least steps a), b), c), d) and e) are implemented in at least one reactor, in particular the same reactor, a characteristic distance of said reactor between two inner walls being at least between 6 mm and 70 mm, preferably between 20 and 60 mm, further preferably between 30 and 50 mm.

Such a process can be carried out by batch or in a continuous mode.

By "inner wall of the reactor" in the meaning of the present invention is meant the wall which is directly in contact with the reagents. For example, for a double jacket reactor it is the wall of the inner jacket directly in contact with the reagents. By "characteristic distance between two inner walls" in the meaning of the present invention is meant the maximum distance between two inner parallel walls, or between the surface tangent to one of these walls and a wall parallel thereto, or between two surfaces tangent to the wall. For example, for a cylindrical reactor the characteristic distances between two inner walls of the reactor are the inner diameter and the inner height of the reactor. For a cubic reactor, the characteristic distance between two inner walls of the reactor is the inner side of the cube. For a parallelepiped reactor, the characteristic distances between two inner walls of the reactor are the inner height, the inner length and the inner width. Preferably, the characteristic distance between two inner walls is chosen from among the inner height, inner width, inner length, inner thickness and inner diameter.

On account of the particular geometry of the reactor, the distance from every point inside the reactor to the inner wall of said reactor is such that the diffusion of the reagents in the alcogel is optimal. If all the characteristic distances of the reactor between two inner walls are greater than 200 mm, the reagents do not diffuse to the core of the alcogel and the product obtained does not have a homogeneous composition. In addition, such a reactor also allows optimizing the pre-drying conditions of the alcogel at step e) if it is conducted in such a reactor.

In the meaning of the present invention, a "fibrous reinforcement material" comprises fibres or a non-woven fibrous batting, or a mixture thereof. The person skilled in the art will know how to choose from among the various types of fibres those which are best adapted for the manufacture of thermal insulations, e.g. glass fibres, mineral fibres, polyester fibres, aramid fibres, nylon fibres and plant fibres or a mixture thereof. Regarding the choice of fibres, those skilled in the art can refer to U.S. Pat. No. 6,887,563.

By "non-woven fibrous batting" in the meaning of the present invention is meant a three-dimensional batting formed of a structured but nonwoven tangle of fibres. When fibres are woven the heat conductivity of the fibrous batting increases and lower performance levels of the xerogels are obtained.

In the present invention, the residual quantity of alcohol by weight of the panel is calculated using standard EN/ISO 3251. The protocol used consists of sampling 1 g of xerogel of the invention, weighing and then drying this sample for 3 h in an oven at 105° C., then weighing the dried xerogel.

The process is therefore reproducible and reliable, the products obtained being of constant quality.

Advantageously, no binder is used or added at any step of the process of the invention.

In one preferred embodiment of the invention, steps a), b), c) d) and e) are performed in a first reactor, then the condensed alcogel is released from the mould and transferred to a convective or dielectric dryer where step f) is carried out.

By "dryer" in the meaning of the present invention is meant a reactor intended to be used for a drying step.

Preferably the sol used at step a) is chosen from the group of silica, titanium oxide, manganese oxide, calcium oxide, calcium carbonate, zirconium oxide sols, or mixtures thereof. Preferably, the sol is a silica sol.

Advantageously the alcohol used is ethanol.

Preferably, the silica sol of the invention is obtained by controlled hydrolysis of tetraethoxysilane in ethanol. Advantageously, the ethanol generated during hydrolysis is recycled then re-used as solvent for this same step.

Advantageously, the alcogel obtained at step b) comprises 70 to 90% alcohol by weight, preferably 75 to 85% alcohol by weight, relative to the weight of the starting sol.

The ageing step c) allows the mechanical properties of the alcogel to be improved under the effect of syneresis mechanisms (separation of the liquid and gel). This ageing step advantageously lasts less than 24 h. The ageing temperature and time conditions are chosen to be those suitable in accordance with criteria well known to the person skilled in the art e.g. the gel composition.

Advantageously, the ageing step c) is conducted at a temperature of between 40° C. and 100° C., notably between 40° C. and 80° C., preferably between 60° C. and 80° C. More advantageously, step c) is conducted at the boiling point of the alcohol (alcogel solvent). Further advantageously, step c) is conducted under ethanol refluxing.

Advantageously, the ageing step c) lasts less than 20 h.

Preferably, step d) comprises the contacting of the alcogel obtained at step c) with a hydrophobizing agent in an acid medium of pH between 1 and 3.

Advantageously, the alcogel is acidified at step d) through the addition of a mineral or organic acid. Further advantageously, the mineral acid is hydrochloric acid and the organic acid is trifluoroacetic acid.

Advantageously, the hydrophobizing agent used is chosen from the group of organosiloxanes, organochlorosilanes or organoalkoxysilanes, more advantageously the hydrophobizing agent used is chosen from the group consisting of hexamethyldisiloxane (HMDSO), trimethylchlorosilane and trimethylethoxysilane, preferably it is hexamethyldisiloxane (HMDSO).

Further advantageously, the acid is trifluoroacetic acid or hydrochloric acid and the hydrophobizing agent is hexamethyldisiloxane (HMDSO).

Advantageously, step d) is conducted at a temperature of between 50° C. and 150° C. More advantageously, step d) is conducted at the boiling point of the hydrophobizing agent. Further advantageously step d) is conducted under hydrophobizing agent refluxing, the hydrophobizing agent being advantageously chosen from the group consisting of hexamethyldisiloxane (HMDSO), trimethylchlorosilane and trimethylethoxysilane, and preferably being hexamethyldisiloxane (HMDSO).

With this treatment, it is possible to obtain a hydrophobized silica alcogel known to exhibit a lower density after drying than equivalent non-hydrophobized alcogels. Non-hydrophobized silica gels effectively have a tendency to collapse during drying steps.

In one preferred embodiment of the invention, an additive is added to the sol at step a). Preferably, the additive is intended to improve the mechanical, cohesive or thermal conductivity properties of the self-supporting, insulating, single-layer, monolithic panels.

Preferably, this additive comprises an opacifier. The use of an opacifier allows a reduction in thermal conductivity value by reducing the radiating component thereof. Advantageously, this additive is an opacifier chosen from among SiC, $TiO_2$, carbon black, graphite, $ZrO_2$, ZnO, $SnO_2$, MnO, NiO, TiC, WC, $ZrSiO_4$, $Fe_2O_3$, $Fe_3O_4$, $FeTiO_3$. In particular, the opacifier is chosen from the group consisting of SiC and $TiO_2$.

In one preferred embodiment, the process according to the invention comprises the pre-drying step e).

Pre-drying is continued until a condensed alcogel is obtained having lost between 10 and 80% of alcohol by weight, advantageously between 20% and 60% by weight of alcohol, more advantageously between 40% and 50% by weight of alcohol relative to the weight of the starting products.

The weight of alcohol lost during step e) is measured differently depending on the scale of the process. On a laboratory scale, this quantity is measured by weighing the alcogel obtained after step d) before and after drying under the conditions of step e). On an industrial scale, the alcohol evaporated at the drying step e) is condensed in another reactor and then weighed.

During the process of the invention, a condensed alcogel is obtained as intermediate product after the pre-drying step e). This condensed alcogel is of reduced volume relative to the volume of the alcogel obtained after step d). In practice, a volume reduction of 10% to 40% is observed.

However, during the drying step f) and when a fibrous reinforcement material is added at step a), the insulating composite xerogel obtained recovers a volume equal to or greater than the volume of the condensed alcogel obtained after step e). Said condensed alcogel is itself self-supporting i.e. it has mechanical properties enabling it to be released from a mould and conveyed to undergo a second drying step or any other treatment in another reactor. It may also be stored for several weeks, even several months without degradation of its physical or mechanical qualities.

Advantageously, the pre-drying temperature at step e) is between 40° C. and 80° C., more advantageously between 60° C. and 80° C., and further advantageously it is 80° C.

In one preferred embodiment of the invention, step e) is performed by circulating a hot gas flow inside the reactor. The gas flow is a flow of inert gas such as nitrogen, air or a rare gas. Advantageously, the hot gas flow circulates vertically, and further advantageously from top downwards.

In another embodiment, the pre-drying at step e) is conducted under reduced pressure. Said embodiment is advantageous since, at equal temperature, it allows shorter pre-drying times to be obtained.

In one embodiment, step f) is a drying of convective type conducted at a temperature higher than 100° C., notably between 120° C. and 180° C., preferably between 140° C. and 160° C., and further preferably at 150° C.

Advantageously, step f) is performed with convective drying by circulating a flow of hot air in the dryer.

On a laboratory scale, convective drying is preferably carried out in an oven at a temperature of 150° C.

In another embodiment, step f) is performed by microwave dielectric drying under reduced pressure or at atmospheric pressure, preferably under reduced pressure. Advantageously, the pressure is between 10 mbar and 1 bar, notably between 10 mbar and 300 mbar, more advantageously between 20 mbar and 60 mbar. Preferably, the power supplied at this microwave drying step is between 0.3 kW and 3 kW per kg of starting condensed alcogel, more preferably between 0.5 kW and 2 kW per kg of starting condensed alcogel, further preferably it is 1 kW per kg of starting condensed alcogel. Said power is adjusted throughout drying so that the surface temperature of the material is between 40° C. and 400° C., preferably between 40° C. and 200° C., more preferably between 50° C. and 150° C.

In one preferred embodiment of the invention, a fibrous reinforcement material is placed inside the reactor into which the sol is poured at step a). In this case, the xerogel obtained using the process of the invention is a self-supporting, single-layer composite panel.

The fibrous reinforcement material is used to structure the xerogel to improve the properties of mechanical strength and resistance thereof whilst maintaining its thermally insulating properties.

Preferably, the fibrous reinforcement material comprises a nonwoven fibrous batting, advantageously chosen from among organic battings, inorganic battings, battings of natural fibres, mixed battings and mixed laminated battings. Advantageously, the batting is organic and chosen from among organic battings in polyethylene terephthalate (PET). Advantageously, the batting is inorganic and chosen from among inorganic battings of glass wool or battings of rock wool.

Advantageously, the batting is in natural fibres and chosen from among battings of natural fibres of sheep wool or flax fibres.

Advantageously, the nonwoven fibrous batting has a thickness of between 30 and 70 mm and an open porosity of between 96% and 99.8%.

The present invention also concerns an xerogel having a thermal conductivity of between 5 and 25 mW/m·K measured using the guarded hot plate method of standard NF EN 12667 at 20° C. and at atmospheric pressure, optionally comprising a fibrous reinforcement material obtainable by the process of the invention.

Advantageously, the xerogel of the invention does not comprise a binder. As examples of inorganic binders mention may be made of cements, plasters, gypsum, lime, and as examples of organic binders mention may be made of thermoplastics such as polyolefin waxes, styrene polymers, polyamides. The term binder also comprises adhesives such as epoxy resins, cyanoacrylates for example.

Advantageously, the xerogel is chosen from the group of silica, titanium oxide, manganese oxide, calcium oxide, calcium carbonate, zirconium oxide, polyurethane/cellulose xerogels, more preferably from the group of silica, titanium oxide, manganese oxide, calcium oxide, calcium carbonate xerogels, further preferably it is a silica xerogel.

Advantageously the xerogel of the invention has a thermal conductivity, measured using the guarded hot plate method of standard NF EN 12667 at 20° C. and at atmospheric pressure, of between 10 and 20 mW/m·K, further advantageously of between 10 and 15 mW/m·K.

It is ascertained that the xerogels of the invention have a density of between 0.05 g·cm$^{-3}$ and 0.5 g·cm$^{-3}$. Advantageously, the xerogel of the invention has a density of between 0.05 g·cm$^{-3}$ and 0.25 g·cm$^{-3}$, and more advantageously of between 0.07 g·cm$^{-3}$ and 0.15 g·cm$^{-3}$.

The xerogels of the invention are of strong interest through their low density and insulating capacity, but they need to be bagged before use as insulating material for easier handling if they are not reinforced with a fibrous reinforcement material. It is therefore desirable that they should be reinforced to obtain the structuring and rigidifying thereof.

The composite xerogels thus obtained combine the mechanical properties of the fibres and the insulating properties of the xerogels.

In one preferred embodiment, the xerogel of the invention therefore comprises a fibrous reinforcement material. In this case the xerogel assumes the form of a self-supporting, insulating, single-layer composite panel.

The present invention is also related to a self-supporting, insulating, single-layer composite panel of thickness of between 30 mm and 70 mm, having a thermal conductivity of between 5 and 25 mW/m·K measured using the guarded hot plate method of standard NF EN 12667 at 20° C. and at atmospheric pressure, and comprising an xerogel including a fibrous reinforcement material obtainable by the process of the invention.

Advantageously the self-supporting, insulating, single-layer composite panel of the invention does not comprise a binder.

Such a binder is needed in the prior art to prepare insulating, single-layer composite panels based on a xerogel which are self-supporting. However, the presence of a binder leads to the formation of thermal bridges.

Advantageously the self-supporting, insulating, single-layer composite panel has a thickness of between 30 mm and 60 mm, and more advantageously between 40 mm and 45 mm.

Advantageously the self-supporting, insulating, single-layer composite panel has a thermal conductivity, measured using the guarded hot plate method of standard NF EN 12667 at 20° C. and at atmospheric pressure, of between 10 and 20 mW/m·K, more advantageously between 10 and 15 mW/m·K.

It is ascertained that the self-supporting, insulating, single-layer composite panels of the invention have a density of between 0.05 g·cm$^{-3}$ and 0.5 g·cm$^{-3}$. Advantageously the self-supporting, insulating, single-layer composite panel has a density of between 0.05 g·cm$^3$ and 0.25 g·cm$^3$.

In one preferred embodiment of the invention, the fibrous reinforcement material comprises a nonwoven fibrous batting advantageously chosen from among organic battings, inorganic battings, battings of natural fibres, mixed battings and mixed laminated battings. Advantageously, the organic batting is chosen from among organic battings in polyethylene terephthalate (PET). Advantageously, the inorganic batting is chosen from among inorganic battings of glass wool or battings of rock wool. Advantageously, the batting of natural fibres is chosen from among battings of natural fibres of sheep wool or flax fibres.

Advantageously, the nonwoven fibrous batting has a thickness of between 30 and 70 mm and an open porosity of between 96% and 99.8%. Advantageously, the nonwoven fibrous batting has a thermal conductivity of less than 50 mW/m·K measured using the guarded hot plate method of standard NF EN 12667 at 20° C. and at atmospheric pressure.

In one preferred embodiment of the invention the self-supporting, insulating, single-layer composite panel comprises between 50% and 90% by weight of xerogel relative to the weight of the panel, preferably between 60% and 80% by weight of xerogel relative to the weight of the panel. If the panel comprises less than 50% or more than 90% by weight of xerogel relative to the weight of the panel, the value of thermal conductivity becomes higher than 25 mW/m·K measured using the guarded hot plate method of standard NF EN 12667 at 20° C. and at atmospheric pressure.

In one preferred embodiment of the invention, the xerogel is chosen from among silica, titanium oxide, manganese oxide, calcium oxide, calcium carbonate, zirconium oxide xerogels or mixtures thereof, more preferably from the group of silica, titanium oxide, manganese oxide, calcium oxide, calcium carbonate xerogels, further preferably it is a silica xerogel.

The hydrophobizing treatment at step d) of the process particularly allows a reduction in the water reuptake of the panel. The self-supporting, insulating, single-layer composite panel of the invention preferably has a water reuptake rate at ambient temperature and at 75% relative humidity of less than 5%, more preferably less than 3% and further preferably a water reuptake rate at ambient temperature and at 95% relative humidity of less than 10% and further preferably less than 5%.

The present invention concerns the use of xerogels according to the invention for manufacturing building materials and thermal insulations.

The present invention also concerns the use of a self-supporting, insulating, single-layer composite panel for the manufacture of building materials and thermal insulations, preferably insulating walls and partitions.

In one embodiment they are used for the insulating of parquets or ceilings.

Finally, the present invention concerns mixed multi-layer panels comprising a combination of panels according to the invention with other panels of different type. For example one or more plaster boards (optionally of BA13 type) can be glued onto one or onto each side of an insulating, single-layer panel of the invention to form a lining complex.

The panels of the invention can also be used as sound insulation.

FIGURE

FIG. 1: Trend in the thickness of the self-supporting, insulating, single-layer composite panel as a function of drying time, under the operating conditions of Example 5.

The following examples are intended to illustrate the present invention in more detail but are in no way limiting.

EXAMPLES

Example 1

Preparation of Silica Xerogels in a Cylindrical Chamber with Various Thicknesses 1) Preparation of Hydrophobic Silica Alcogels A silica sol having the following composition: 36.2% polyethoxydisiloxane in 20% solution in ethanol and obtained by partial hydrolysis of tetraethoxysilane (TEOS) in the presence of hydrochloric acid, 54.3% ethanol, 8.9% permuted water, 0.6% ammonia was placed before gelling in a closed cylindrical chamber of variable dimensions (cylindrical discs of diameter 100 mm and thickness of 30, 50, 70 or 100 mm). This silica sol was gelled after placing in the chamber to form a silica alcogel.

After an ageing phase of the gel in ethanol for 19 h30 at 70° C., the mixture of hydrochloric acid (3 weight %) and hexamethyldisiloxane (97 weight %) was placed in the reactor so as to cover the alcogel entirely. The reaction medium was heated and held at 70° C. for 6 h. The reaction medium was then separated from the hydrophobized alcogel by percolation.

2) Obtaining Silica Xerogels

The gels obtained had a thickness of 3 cm, 5 cm, 7 cm and 10 cm respectively and were dried in a ventilated oven at 160° C. for 1 h30.

All the beds of silica xerogel particles obtained after drying exhibited a bulk density of between 0.05 g·cm$^{-3}$ and 0.1 g·cm$^{-3}$, irrespective of their thickness. The bulk densities measured on the beds of xerogel particles obtained were 50 kg/m$^3$, 70 kg/m$^3$, 85 kg/m$^3$ and 100 kg/m$^3$ for gel thicknesses of 3, 5, 7 and 10 cm, respectively.

The thermal conductivity values measured on the samples obtained, using the guarded hot plate method of standard NF EN 12667 at 20° C. and at atmospheric pressure, were 21.6 mW/m·K, 21.8 mW/m·K, 23.5 mW/m·K and 25.7 mW/m·K for gel thicknesses of 3, 5, 7 and 10 cm respectively.

This example clearly shows the threshold effect related to the size of the reaction chamber. When the chamber has a thickness of 70 mm or less, the thermal conductivity of the silica xerogel obtained is lower than 25 mW/m·K.

Example 2

Preparation of Silica Xerogels with Various Drying Conditions

1) Preparation of a Hydrophobic Silica Alcogel

A silica sol obtained in the same conditions as example 1 by hydrolysis of alkoxysilane in the presence of hydrochloric acid is gelled in the presence of ammonia. After an ageing phase of 4 h under ethanol refluxing, hydrochloric acid and hexamethyldisiloxane (3:97) (hydrophobizing agent) were added to the reactor so as to fully cover the silica alcogel. The reaction medium was heated and held under reflux for 4 h. The reaction medium was then separated from the hydrophobic silica alcogel by percolation.

The hydrophobic silica alcogel (250 g) thus obtained was then divided in pieces having a size comprised between 1 and 20 mm and introduced in a crystallizing dish.

2) Preparation of a "Condensed" Hydrophobic Silica Alcogel

The crystallizing dish containing the hydrophobic silica alcogel (250 g) divided in pieces was placed in a ventilated oven and the sample was dried at 80° C. until it has lost about 50% of its initial weight.

3a) Obtaining a Hydrophobic Silica Xerogel by Convective Drying in a Ventilated Oven The "condensed" hydrophobic silica alcogel previously obtained was dried in a ventilated oven at 160° C. for 60 min. The bed of hydrophobic silica xerogel granules obtained exhibited a bulk density of 0.06 g·cm$^{-3}$, and the xerogel granules obtained had dimensions comprised between about 0.1 and 10 mm. The thermal conductivity value measured on the granules having a size comprised between 1 mm and 1.2 mm, using the guarded hot plate method of standard NF EN 12667 at 20° C. and at atmospheric pressure, was 19.8 mW/m·K.

3b) Obtaining a Hydrophobic Silica Xerogel by Dielectric Drying Under Reduced Pressure The "condensed" hydrophobic silica alcogel previously obtained was dried in a microwave drier under vacuum (40-60 mbar), under gentle stirring, and by applying an incident power of 0.5 kW/kg of alcogel. After 20 min of drying, the power reflected by the system was above 160 W·h/kg of alcogel initially introduced. At this stage, the incident power was adjusted to 0.3 kW/kg of alcogel initially introduced and samples were collected at various drying times (33 min, 39 min, 46 min, 51 min and 55 min) corresponding to a total power absorbed by the system of 0.225 Wh, 0.233 Wh, 0.234 Wh, 0.236 Wh and 0.238 Wh per kg of alcogel initially introduced in the drier. The surface temperatures recorded during the drying of the various samples were between room temperature (recorded during the first 20 min of drying) to 78° C. (recorded at the end of the drying). The contents in volatile components of these samples were respectively 16%, 2.5%, 1.6%, 1.0% and 0.9%. The bulky densities of these samples were respectively 0.249 g/cm$^3$, 0.086 g/cm$^3$, 0.078 g/cm$^3$, 0.078 g/cm$^3$ and 0.078 g/cm$^3$. The thermal conductivity values measured on granules having a size of between 1 mm and 1.2 mm, using the guarded hot plate method of standard NF EN 12667 at 20° C. and at atmospheric pressure, were respectively 45.8 mW/mK, 19.7 mW/mK, 17.6 mW/mK, 18.0 mW/mK and 18.1 mW/mK.

3c) Obtaining a Hydrophobic Silica Xerogel by Dielectric Drying at Atmospheric Pressure The "condensed" hydrophobic silica alcogel previously obtained was dried in a microwave drier at atmospheric pressure, in a stream of nitrogen having a flow of 1.0 L/min, under gentle stirring, and by applying an incident power of 6.7 kW/kg of alcogel. After 3.5 min of drying, the power reflected by the system was 2.7 kW/kg of alcogel initially introduced. At this stage, the incident power was adjusted to 1.85 kW/kg of alcogel initially introduced for 45 min, until the reflected power of the system was 2 kW/kg of alcogel. During the drying, the surface temperature of the sample was between room temperature and 50° C. for the first 3.5 min of the drying and between 50 and 78° C. during the last 45 min of this drying. The silica xerogels obtained were in the form of translucent granules having dimensions comprised between about 0.1 and 10.0 mm. The bulky density of the bed of granules thus obtained was 0.076 g/cm$^3$. The thermal conductivity value measured on granules having a size of between 1 mm and 1.2 mm, using the guarded hot plate method of standard NF EN 12667 at 20° C. and at atmospheric pressure, was 18.0 mW/mK.

Example 3

Preparation of a Self-supporting, Single-layer, Composite Panel of 25 Mm Thickness with No Pre-drying Step 1) Preparation of a Composite Silica Alcogel A silica sol obtained in the same conditions as example 1 by hydrolysis of alkoxysilane in the presence of hydrochloric acid followed by the addition of ammonia, was poured before gelling onto a nonwoven fibrous batting in sheep wool (85% wool and 15% PET) of size 110×100×30 mm$^3$ previously placed in a closed chamber of size 120×120×70 mm$^3$. After gelling, the reinforced alcogel was aged for 20 h at 60° C. The solvent released during the ripening step (ageing) was then removed by decantation. Hydrochloric acid and hexamethyldisiloxane (hydrophobizing agent) in a weight ratio of 3:97 were then added to the reactor so as to fully cover the composite alcogel. The reaction medium was heated and held at 60° C. for 20 h. The reaction medium was then separated from the reinforced, hydrophobic silica alcogel by percolation.

2) Obtaining a Panel of Hydrophobic Composite Silica Xerogel.

The alcogel reinforced with the nonwoven fibrous batting was dried directly in a ventilated oven at 140° C. for 2 hours. The xerogel panel obtained measured 25 mm in thickness and displayed a thermal conductivity of 32.2 mW/m·K, measured using the guarded hot plate method of standard NF EN 12667 at 20° C. and at atmospheric pressure.

This example clearly shows that the pre-drying step is necessary to obtain a thermal conductivity value equal to or less than 25 mW/m·K for a self-supporting, single-layer, composite xerogel panel.

Example 4

Preparation of a Silica Xerogel According to the Invention

1) Preparation of a Hydrophobic Silica Alcogel

A silica sol obtained in the same conditions as example 1 by hydrolysis of alkoxysilane in the presence of hydrochloric acid was gelled with ammonia after being placed in a cylindrical reactor equipped with a candle casting mould and having a characteristic distance of 6 cm. After an ageing phase of 4 h under ethanol refluxing, hydrochloric acid and hexamethyldisiloxane (3:97) (hydrophobizing agent) were added to the reactor so that they fully covered the silica alcogel. The reaction medium was heated and held under reflux for 4 h. The reaction medium was then separated from the hydrophobic silica alcogel by percolation.

The hydrophobic silica alcogel (250 g) thus obtained was transferred to a crystallizing dish for drying according to the invention.

2) Preparation of a "Condensed" Silica Alcogel

The crystallizing dish containing the 250 g of hydrophobic silica alcogel was placed in a ventilated oven and the sample was dried at 80° C. until it had lost about 50% of its initial weight.

3) Obtaining a Silica Xerogel

The "condensed" hydrophobic silica alcogel previously obtained was dried in a ventilated oven at 160° C. for 60 minutes. The bed of hydrophobic silica xerogels obtained had a bulk density of 0.06 g/cm$^3$ and the size of the xerogel granules obtained was between about 0.1 and 10 mm. The thermal conductivity value, measured on granules having a size of between 1 mm et 1.2 mm using the guarded hot plate method of standard NF EN 12667 at 20° C. and at atmospheric pressure, was 19.8 mW/m·K.

Example 5

Preparation of a Self-Supporting, Insulating, Single-Layer Composite Panel of 40 Mm Thickness According to the Invention 1) Preparation of a Composite Hydrophobic Silica Alcogel A silica sol obtained in the same conditions as example 1 by hydrolysis of alkoxysilane in the presence of hydrochloric acid followed by the addition of ammonia, was poured before gelling onto a nonwoven fibrous batting in polyethylene terephthalate (PET) of size 100×100×40 mm$^3$ in a closed chamber of size 120×120×70 mm. After gelling, the reinforced alcogel was aged for 4 h under ethanol refluxing. Hydrochloric acid and hexamethyldisiloxane (3:97) (hydrophobizing agent) were then placed in the chamber so as to fully cover the composite alcogel. The reaction medium was heated and held under reflux for 4 h. The reaction medium was separated from the hydrophobic silica alcogel by percolation.

2) Preparation of a Reinforced Condensed Alcogel

The reinforced hydrophobic silica alcogel was placed in a ventilated oven and dried at 80° C. for 1 h20 until it lost about 50% of its initial weight.

3) Obtaining a Panel of Hydrophobic Composite Silica Xerogel

The condensed alcogel reinforced with the nonwoven fibrous batting was dried in a ventilated oven at 160° C. for 2 h15. The xerogel panel obtained measured 40 mm thick and displayed a thermal conductivity of 15 mW/m·K, measured using the guarded hot plate method of standard NF EN 12667 at 20° C. and at atmospheric pressure.

The trend in thickness of the composite throughout drying is illustrated in FIG. 1. A so-called "spring effect" is observed.

Example 6

Preparation of a Self-supporting, Insulating, Single-layer Composite Panel of 25 Mm Thickness According to the Invention 1) Preparation of a Composite Hydrophobic Silica Alcogel As for example 6, a silica sol obtained by mixture of a solution of polyethoxydisiloxane in ethanol and ammonia, was poured before gelling onto a nonwoven fibrous batting in PET of size 300×260×25 mm$^3$ in a closed chamber. After gelling, the reinforced alcogel was aged for 4 h under ethanol refluxing. Hydrochloric acid and hexamethyldisiloxane (3:97) (hydrophobizing agent) were then placed in the chamber so as to fully cover the composite alcogel. The reaction medium was heated and held under reflux for 4 h. The reaction medium was separated from the hydrophobic silica alcogel by percolation.

2) Preparation of a Reinforced Condensed Alcogel

The reinforced hydrophobic silica alcogel was placed in a ventilated oven and dried at 80° C. for 1 h20 until it lost 48% of its initial weight.

3) Obtaining a Panel of Hydrophobic Composite Silica Xerogel

The condensed alcogel reinforced with the nonwoven fibrous batting was dried in a ventilated oven at 160° C. for 2 h. The xerogel panel obtained measured 25 mm thick and displayed a thermal conductivity of 14 mW/m·K, measured using the guarded hot plate method of standard NF EN 12667 at 20° C. and at atmospheric pressure.

The invention claimed is:

1. A process for manufacturing xerogel having a thermal conductivity of between 5 and 25 mW/m.K measured using the guarded hot plate method of standard NF EN 12667 at 20° C. and at atmospheric pressure, comprising the successive steps of:
   a) pouring a sol with alcohol as solvent into a reactor in which a fibrous reinforcement material has previously been placed,
   b) gelling the sol to an alcogel,
   c) ageing the alcogel,
   d) hydrophobization treatment of the alcogel after which a hydrophobized alcogel is obtained,
   e) pre-drying of the alcogel under subcritical conditions at a temperature equal to or lower than 80° C., and
   f) drying the alcogel under subcritical conditions, said drying being a dielectric or convective drying, so that the xerogel obtained has a residual quantity of alcohol by panel weight of 3% or lower as per standard EN/ISO 3251,
   provided that at least steps a), b), c), d) and e) are implemented in the same reactor, a smallest characteristic distance of said reactor between at least two inner walls being between 30 mm and 70 mm.

2. The process according to claim 1, wherein steps a), b), c) d) and e) are conducted in a first reactor, the condensed alcogel is then released from the first reactor and transferred to a convective or dielectric drier in which step f) is performed.

3. The process according to claim 1, wherein the sol used at step a) is selected from the group consisting of silica, titanium oxide, manganese oxide, calcium oxide, calcium carbonate, zirconium oxide sols, and mixtures thereof.

4. The process according to claim 1, wherein the alcogel obtained at step b) comprises 70 to 90% by weight of alcohol, of alcohol relative to the weight of the starting sol.

5. The process according to claim 1, wherein step d) comprises the contacting of the alcogel obtained at step c) with a hydrophobizing agent in an acid medium of pH between 1 and 3.

6. The process according to claim 5, wherein the hydrophobizing agent used is selected from the group consisting of organosiloxanes, organochlorosilanes and organoalkoxysilanes.

7. The process according to claim 1, wherein an additive is added to the sol at step a).

8. The process according to claim 1, wherein step f) is a drying step of convective drying performed at a temperature higher than 100° C.

9. The process according to claim 1, wherein step f) is a microwave dielectric drying step under a pressure between 10 mbar and 1 bar.

10. The process of claim 6, wherein the hydrophobizing agent used is selected from the group consisting of hexamethyldisiloxane (HMDSO), trimethylchlorosilane and trimethylethoxysilane.

11. The process of claim 7, wherein the additive contains an opacifier.

12. The process according to claim 8, wherein the convective drying is performed at a temperature of between 120° C. and 180° C.

* * * * *